Jan. 6, 1925. 1,522,091
C. M. ALEXANDER
PROCESS OF AND APPARATUS FOR DECOMPOSING POTASSIUM BEARING MINERALS
Filed Sept. 9, 1920
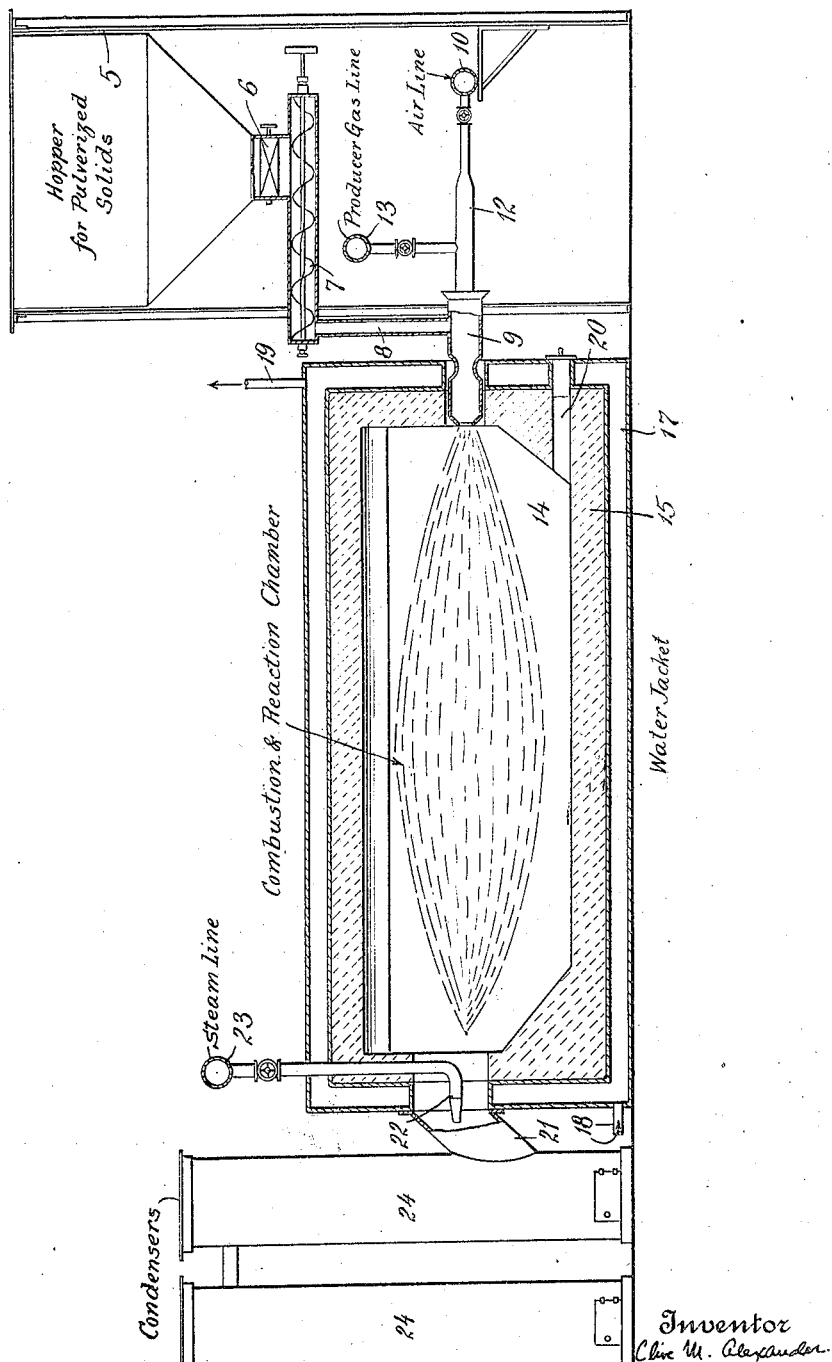

Patented Jan. 6, 1925.

1,522,091

UNITED STATES PATENT OFFICE.

CLIVE MORRIS ALEXANDER, OF WAXAHACHIE, TEXAS.

PROCESS OF AND APPARATUS FOR DECOMPOSING POTASSIUM-BEARING MINERALS.

Application filed September 9, 1920. Serial No. 409,097.

*To all whom it may concern:*

Be it known that I, CLIVE M. ALEXANDER, a citizen of the United States, residing at Waxahachie, in the county of Ellis, State of Texas, have invented certain new and useful Improvements in Processes of and Apparatus for Decomposing Potassium-Bearing Minerals; and I do hereby declare the following to be a full, clear, and exact description of the invention, such as will enable others skilled in the art to which it appertains to make and use the same.

This invention relates to processes of and apparatus for decomposing potassium bearing minerals, and it comprises a method of making potash through thermally decomposing potassium compounds by causing combustion of heat generating materials in intimate contact with the potassium bearing compound, accomplished by injecting a mixture of pulverized solids and gases into a reaction chamber wherein the heat necessary for the decomposition of the potassium compound contained in the said mixture is obtained through the combustion of fuel which is also a part of said mixture. The invention also comprises a combination of apparatus elements including a reaction chamber and means for mixing and injecting the reaction materials and heating materials therein.

After the materials have reacted to a certain point, I find it advantageous to inject steam into contact with the mixture, which tends to freeze the reaction and prevents it running in the reverse direction, thus giving a better potash recovery. The injection of steam is made just after the materials leave the high temperature zone.

Potassium compounds have many uses in the arts and are especially valuable as fertilizer ingredients. Many methods have been used in the industry for obtaining potash in a form for utilization as a fertilizer but have not proved very successful in an economic way. Among the sources of potash other than the directly usable natural deposits might be mentioned kelp, and mineral deposits, such as alunite and feldspars; it is also obtained as a by-product from cement kilns and blast furnaces. The greatest possible source of potassium is the silicate minerals from which many attempts have been made to recover it through extraction by lixiviation with chemicals or through thermal decomposition, alone or with the aid of chemicals. These processes have not been economical on account of the inefficiency of reaction, cost of materials, and operating cost, largely due to wear and tear on the apparatus.

Many processes have been devised whereby the inexpensive potassium bearing silicates are heated to their decomposition temperatures and the potassium then fixed through the action of some chemical agent or are heated to a temperature whereby the potash is volatilized. It is almost impossible to build an apparatus to withstand the high temperature necessary for decomposition when the heat is applied from the outside. For this reason in processes using high temperatures the heat is applied direct either by blowing air into a retort containing lumps of the mineral and coke, or by electrical heating. These methods are expensive and do not attain efficient decomposition of the mineral or fixing of the potassium even though chemicals are used therewith.

In the present invention I intimately mix the mineral to be decomposed and the heat producing materials before introducing them into the reaction chamber and inject these by suitable means into this chamber. All the solids are finely pulverized and suspended in the gases. The heat necessary to maintain the reaction temperature is obtained through the combustion of the fuel and air in the same zone and in intimate contact with the mineral to be decomposed. Very efficient heating is thereby obtained and the temperature and degree of combustion can be readily controlled. Since the heating is effected within the reaction chamber instantaneous heat transfer to the heat absorbing material is obtained and also the reaction chamber is not subjected to as high a temperature as would be the case where heating is accomplished from the outside. The reaction chamber can further be made gas tight and also can be cooled on the outside by using a cooling jacket with air or water. The injection of the heating agents with the mineral to be decomposed has another essential function, that of carrying the pulverized solids in suspension. With the solids pulverized and suspended in the gases the maximum amount of surface is thereby exposed to heating and to reaction. The result is a very complete decomposition of the potassium bearing mineral and fixation of the potassium in a utilizable form.

In carrying out this process the potassium bearing silicate, such as potash feldspar (orthoclase) $KAlSi_3O_8$ slate, etc., and the fuel, coal or coke, are first dried to remove moisture. The two materials are mixed in approximately equal proportions and then pulverized to 95% through 100 mesh and 85% through 200 mesh which gives an average mix of approximately 150 mesh. This highly pulverized mixture of reacting materials and fuel is conveyed to a mixing device or tuyère wherein it is intimately mixed with the desired proportion of air and continuously blown into the reaction chamber. Approximately 150 cubic feet of air are required for the complete combustion of a pound of coal or coke. This air, when injected through the tuyère, has a carrying capacity for approximately three pounds of pulverized solids, i. e., under conditions where the combustion of a pound of coal is sufficient to maintain the temperature required, two pounds of pulverized mineral can be carried in addition by the air. With more air proportionately more solids can be carried suspended in the gases. However, it has been found that the amount of mineral that can be added is less than the maximum carrying capacity of the air since it smothers the fuel combustion and prevents ignition Prior to injecting the material to be decomposed it is necessary, through the use of fuel and air alone, to heat the reaction chamber to the decomposition temperature, which is approximately 2500° F. This temperature once attained is maintained through injecting the fuel in the required quantities along with the mineral to be decomposed. Combustion takes place in intimate contact with the material to be decomposed and results in a most efficient heat transfer. On account of the very finely divided state of the solids, they expose maximum surface for reaction and act much like gases. Decomposition of the potassium bearing mineral takes place readily at the high temperature and the potassium compounds set free are held fixed in the combustion gases through the reduced pressure effect and combines with the carbon dioxide. The potash is carried from the reaction chamber in the combustion gases and is later on collected by condensing as potassium carbonate. The operating conditions are very readily maintained and the reaction most efficiently controlled and carried out in what may be termed the vapor state, since the solids are suspended and so finely divided that they act very much like a true vapor.

When coke is used as the fuel it is best to add a little producer gas with the reaction mixture in order to obtain uniform ignition throughout the mass. With coals containing 10% or more volatile matter this is not necessary. Producer gas alone can also be readily used as the fuel.

In order to more fully explain the invention, reference is made to the accompanying drawing, which illustrates in a diagrammatic way an apparatus for carrying out the process of the invention.

The hopper for the mixture of finely pulverized ore and finely pulverized fuel, such as coal or coke, is indicated at 5. The hopper may be provided with a gate 6, leading to the screw conveyor 7, which in turn communicates with the pipe 8 leading to the tuyère or mixing nozzle 9. Air under suitable pressure from the air line 10 is led by the pipe 12 to the tuyères 9. Producer gas from the producer gas line 13 may also be arranged to be led into the tuyère.

The tuyère opens at its outer end into a combustion and reaction chamber 14, lined with a suitable refractory material 15. A cooling jacket 17 may be put around this chamber, the inlet and outlet pipes for the cooling water being indicated at 18 and 19, respectively. A suitable opening 20 may be provided for cleaning out the chamber 14.

Steam injecting means, such as a nozzle 22, to which steam is lead from the steam line 23, may be arranged to inject steam into the reacting materials after the reaction has proceeded to the desired point. This steam cools the reacting materials and operates to "freeze" the reaction and to prevent it running in the opposite direction. The steam injecting means may conveniently be arranged at the outlet from the chamber 14, although it should be understood that it may be positioned further in or further out, in accordance with the particular conditions and temperatures that may be met with.

An outlet pipe 21 leads certain of the reaction products to one or more condensers 24.

The high temperature attained within the combustion and reaction chamber very rapidly and completely decomposes the potassium containing mineral, resulting principally in the formation of potassium carbonate, alumina and aluminum silicate. The potassium carbonate is more volatile than the other products and passes into the condensers, while the less volatile products remain in the chamber 14.

The degree of oxidation and the temperature attained in the reaction chamber may be controlled both by regulating the amount of pulverized solid fuel and by the use of more or less producer gas. Ordinarily with pulverized coal, it will not be necessary to use the producer gas, but with coke, it is preferable to use a small amount of such gas in order to give better combustion and ignition in the chamber 14.

I claim as my invention:—

1. The process of decomposing potassium bearing minerals, comprising injecting pulverized mineral, fuel and air, into a combustion and reaction chamber.

2. The process of decomposing potassium bearing minerals, comprising mixing pulverized mineral and fuel and blowing the mixture into a combustion and reaction chamber with a blast of air.

3. The process of decomposing potassium bearing minerals, comprising injecting pulverized mineral, pulverized fuel, air and producer gas, into a combustion and reaction chamber.

4. The process of decomposing potassium bearing minerals, comprising injecting pulverized mineral, pulverized fuel and air, into a combustion and reaction chamber and after the reaction has proceeded to a certain point, injecting steam to freeze the reaction.

5. The process of forming potassium carbonate, comprising injecting pulverized potassiferous mineral and finely-divided carbonaceous fuel by means of a blast of air, into a combustion and reaction chamber.

6. The process of decomposing potash-bearing minerals, comprising injecting finely-divided mineral into a combustion and reaction chamber where it comes into intimate contact with burning fuel.

7. In an apparatus for decomposing minerals, a combustion and reaction chamber, means for injecting fuel, the mineral being treated, in finely divided form, and air, into said chamber, and means, near the outlet of the chamber, for injecting steam.

8. In an apparatus for decomposing minerals, a combustion and reaction chamber, means for injecting a blast of air and fuel into the chamber and means for mingling the mineral being treated in finely divided form with the blast before it enters the chamber.

9. The process of treating a potassium aluminum silicate for the formation of potassium carbonate, alumina and aluminum silicate, comprising pulverizing the potassium aluminum silicate, mixing it with finely divided fuel and injecting the mixture, by means of a gas blast, into a combustion and reaction chamber.

10. A process of treating a potassium aluminum silicate, such as orthoclase or a potash feldspar, for the formation of potassium carbonate, alumina and aluminum silicate, in which the mineral is pulverized and injected by means of a gas blast, into a combustion and reaction chamber, where it comes into intimate contact with burning fuel.

In testimony whereof I affix my signature.

CLIVE MORRIS ALEXANDER.